United States Patent [19]

Witt

[11] Patent Number: 5,114,894

[45] Date of Patent: May 19, 1992

[54] FILTER MATERIAL

[75] Inventor: Paul R. Witt, Muscatine, Iowa

[73] Assignee: Grain Processing corporation, Muscatine, Iowa

[21] Appl. No.: 656,603

[22] Filed: Feb. 18, 1991

[51] Int. Cl.$^5$ ............................................. B01J 20/16
[52] U.S. Cl. ...................................... 502/62; 502/404
[58] Field of Search ................................... 502/62, 404

[56] References Cited

U.S. PATENT DOCUMENTS

| Re. 32,503 | 9/1987 | Steenken | 423/339 |
|---|---|---|---|
| 2,884,412 | 4/1959 | Neukom | 260/233.5 |
| 3,459,632 | 8/1969 | Caldwell et al. | 162/175 |
| 4,045,342 | 8/1977 | Kuster et al. | 210/81 |
| 4,134,857 | 1/1979 | Bradley et al. | 252/450 |
| 4,457,900 | 7/1984 | Steenken | 502/409 |
| 4,566,910 | 1/1986 | Hubbard et al. | 162/175 |
| 4,647,464 | 3/1987 | Todd, Jr. et al. | 426/423 |
| 4,767,534 | 8/1988 | Ziller | 210/331 |

OTHER PUBLICATIONS

"Interaction Between Starch and Electrolytes", B. J. Oosten, Starch. 42, pp. 327-330 (1990).

*Primary Examiner*—Patrick P. Garvin
*Assistant Examiner*—Brent M. Peebles
*Attorney, Agent, or Firm*—Neuman, Williams, Anderson & Olson

[57] ABSTRACT

A granular filter aid composition for filtering liquids composed of a major amount of phosphorylated starch and minor amounts of clay and cellulosic fibers.

9 Claims, No Drawings

FILTER MATERIAL

This invention relates to a material useful for filtering liquids and in particular liquid beverages.

BACKGROUND OF THE INVENTION

Various liquid beverages are customarily filtered in the manufacturing process. For example, beer transferred from a fermentor to storage is known as ruh beer and contains suspended protein solids and yeast cells which need be removed by filtration. Ruh beer generally contains from $10^7$ to less than $10^6$ cells per milliliter, but will vary depending on the brewing process used. Ruh beer is partially carbonated and is filtered through a filter screen after a filter aid has been applied to the screen.

Brewers and other processors often filter beer and other beverages through a fine mesh screen precoated with a filter aid such as diatomaceous earth or silicic acid. Diatomaceous earths in contact with liquids are known to transfer soluble iron to the liquids. If the transfer of iron is to be avoided, specially treated filters may be used such as described in U.S. Pat. Nos. 4,202,910 and 4,134,857. Specially treated silicon dioxide particles are also sometimes used as a filter aid. These materials are prepared and used as described in U.S. Pat. Nos. 4,647,464 and 4,457,900. The filtered beer should be clear to the eye. Moreover, the filtered beer should have the same clarity and organoleptic aspects after pasteurizing as a beer processed through diatomaceous earth.

The pore size of filter screens used to filter beverages such as beer may vary from one producer to another but is frequently on the order of 60 microns. A diatomaceous earth such as Hyflo-Super-Cel, manufactured by Johns Manville Corporation, is frequently used as a precoating material for the filter screens used in beer breweries. Such filter aids or precoating materials, after use, are a waste material and pose a disposal problem.

A typical analysis of a diatomaceous earth filter aid commonly used for beer production is:
pH: 10.0
Water solubles, %: 0.15
Iron (as $Fe_2O_3$), %: 1.5

Beer, wine and many juices have a pH of 4.5 or lower, and there is evidence that iron present in the filter aid is solubilized in such acidic liquids. In the instance of beer, iron has been known to have a negative effect on clarity and flavor.

OBJECTS OF THE INVENTION

A principal object of the present invention is to provide an advantageous filter aid material for use in filtering liquids such as beverages.

Another object of the invention is to provide a filter aid material that can be recovered after filtration and used as animal feed.

A further object of the invention is to provide a filter aid material that imparts no soluble iron to acidic liquids during filtration.

A still further object of the invention is to provide a novel filter aid material for filtering liquids which is biodegradable with resultant minimization of disposal problems.

SUMMARY OF THE INVENTION

This invention relates to a filter material advantageously adapted for filtering liquids, including particularly liquid beverages such as ruh beer and fruit juices. The filter aid composition of this invention comprises a major amount of phosphorylated starch and minor amounts, less than a total of about 10% of the composition, of clay and cellulosic fibers. Preferably, the amount of clay and cellulosic fibers in the composition are each less than 5% by weight of the composition. The phosphorylated starch is cross-linked so as to be substantially insoluble in water. The filter composition is produced in dry, granular form with the granules having a particle size so as to be retained on the filtering screen which is to be used for filtering liquids.

DETAILED DESCRIPTION OF THE INVENTION

The filter aid material of this invention comprises a cross-linked phosphorylated starch prepared by reacting starch and a phosphate salt. Cross-linking of the starch by phosphorylation is conducted so as to render the starch substantially insoluble in water and to increase the rigidity and granule particle size for retention on a filter screen. Cross-linking of starch by phosphorylation to insolubilize the starch and to increase the particle size of the starch granules is well known in the art. See, for example, U.S. Pat. Nos. 4,566,910, 3,459,632 and 2,884,412. Using a known phosphorylation procedure, those skilled in the art can readily prepare cross-linked phosphorylated starches having the required insolubility and particle size. Any variety of starch can be employed to form the filter aid of this invention, including waxy and non-waxy starches, i.e., starch derived from corn, potato, milo, wheat, and the like.

According to one preferred embodiment of preparing the filter aid composition of the invention, an aqueous slurry of starch having a solids content in the range of say about 40 to 45% is reacted at an alkaline pH, preferably a pH of 10.0 to 10.5, with a phosphorylating agent such as a phosphate salt, for example sodium pyrophosphate. Generally, the phosphorylating agent is employed in an amount ranging from about 1 to 2% by weight of starch or more, if required, to achieve sufficient cross-linking for insolubilization and swelling of the starch granule. The reaction of the starch with the phosphorylating agent is conducted at a temperature of about 60° to 70° C. or higher for a period on the order of say 30 to 60 minutes.

A known viscosity stabilizing agent such as sodium sulfate, sodium chloride and the like is preferably included in the starch-phosphorylating agent reaction mixture to prevent an undesirable increase in viscosity during the reaction. Preferably the Brookfield viscosity of the starch-phosphorylating agent reaction paste containing 40-45% solids is maintained in the range of 100 to 200 centipoise at 60° C. and a pH of 10.0 to 10.5. The viscosity stabilizing agent is generally employed in the slurry in amounts between about 1.7 to 2.0% by weight of starch.

While the reaction mixture is maintained at an alkaline pH and at a temperature above 60° C., a colloidal aluminum silicate clay such as bentonite, kaolin or montmorillonite which contains aluminum in its lattice structure and the like is incorporated in the starch-phosphate salt reaction mixture. The colloidal aluminum silicate clay is added in an amount of about 1.5 to 2.5% by weight of starch to improve the integrity of the starch granule. The clay is also believed to improve the chill-proofing properties of filtered beer.

After addition of the clay, the starch slurry is maintained at the elevated reaction temperature and alkaline pH for a short period of say 10–25 minutes. Then, the reaction slurry is acidified to a pH less than 6.0, preferably a pH of 5.0 to 5.5. A small amount of cellulosic fibers is then added to the acidified slurry in an amount of say 1.5 to 2.5% by weight of the starch. Relatively long cellulosic fibers having an average length on the order of at least 60 microns are preferred. The cellulosic fibers employed exhibit relatively low water absorption capacity, i.e., the fibers should not absorb more than about 6 grams of water per gram. Solka-Floc® 40, manufactured by James River Corporation, Richmond, Va., is exemplary of a preferred type of cellulosic fiber. Solka-Floc® 40 is cellulose fiber material having an average fiber length of 60 microns, a bulk density of 2.8–3.2 cubic centimeters per gram and absorbs only about 5.5 grams of water per gram.

Thereafter, the slurry is filtered and the filter cake washed. It is preferred to wash the filter cake with water containing a microbicide such as peracetic acid, peroxide and others known to be useful for microbial control in starch food products. Preferably, the filter cake from the first filtration is reslurried in water and again filtered and washed.

After washing, the filter cake is dried at a temperature above 50° C., say about 50 to 100° C., and then ground to produce a granulated product, with the bulk (75–80%) of the granules having a particle size somewhat larger than the mesh size of the filter screen on which the filter aid is to be employed. When the filter aid composition of the invention is used to filter liquids such as fruit juices or beer, some shrinkage of the component granules occurs during the filtration. For effectiveness as a filter aid material, the particle size of the filter aid must be sufficiently large to be retained on the filter screen. Thus, the filter cake is ground so that the bulk of the particles have a size substantially greater than the mesh of the filter screen contemplated for use. For example, if the filter aid composition is to be used with a filter screen having a mesh size of 60 microns, it is preferred that the filter cake be ground to produce particles of say about 80 microns.

The following examples further illustrate the present invention and the advantages thereof:

EXAMPLE 1

This example illustrates a preferred embodiment for preparing a filter aid composition according to the invention. A water slurry of corn starch having a solids content of about 40% is prepared and 1.8% sodium sulfate (starch solids basis) is dissolved in the starch slurry at about 45° C. The slurry is then heated to about 68° C., followed by addition of 2.0 M sodium hydroxide, equivalent to 0.44% by weight, based on starch solids. Sodium pyrophosphate, equivalent to 1.1% by weight starch solids, is then dissolved in the slurry.

The temperature is maintained at about 68° C. for 45 minutes, after which 1.8% by weight bentonite is added. Bentonite LD-16 (97% of the particles being greater than 65 mesh), manufactured by Baroid Minerals & Chemicals, is used in this preferred embodiment. This preferred bentonite is composed of about 92% montmorillonite, 3% quartz, 5% feldspars and is an aluminum silicate. Prior to its addition, the bentonite is "hydrated" at pH 9.5–10.0 at 45° C. for about 20 minutes. After addition of the bentonite, the slurry is then held for an additional 15 minutes at about 68° C. The pH of the slurry at this stage is about 9.8–10.6.

Next the slurry is acidified to pH 5.0, and then 1.8% cellulose fiber (Solka-Floc® 40), based on the dry starch weight, is dispersed within the slurry.

The slurry is filtered, then the cake is reslurried in water at 50° C. and again filtered.

The washed cake is dried in forced ventilation at a temperature in the range of 50–100° C. The dried cake is crushed in a roller mill to produce a product of desired granulation, that is, with the bulk (80%) of the dry granules being on the order of 80 microns in diameter.

EXAMPLE 2

This example gives a convenient procedure for evaluating a filter aid as a precoat for a filtering A stirred water slurry is prepared by adding the filter aid material to water to provide a 0.3% by weight suspension. After suspension, the slurry is recirculated through a mesh screen to effect build-up of a precoat thereon.

A 0.3% by weight suspension of the filter aid is recirculated at 400 milliliters per minute through a 9-inch diameter horizontal plate pressure filter, having 60 micron pore openings. Deposition of a precoat is deemed satisfactory if clear discharge water is observed after 2–3 minutes of slurry recirculation.

A filter aid precoat material is considered unsatisfactory if more than five minutes are required to achieve slurry filtrate clarity under these conditions.

EXAMPLE 3

A filter aid precoat composition was prepared according to the procedure described in Example 1. Twenty-five hundred grams of an aqueous starch slurry were used containing 1090 grams of starch on dry basis.

After the filter aid product was prepared it was tested, as described in Example 2, by circulating a water slurry through a 9-inch diameter Sparkler filter equipped with a screen having 60 micron pore openings. The Sparkler filter was satisfactorily precoated and the discharge water from the filter was clear after 2–3 minutes of recycle.

EXAMPLES 4–6

Additional filter aid compositions were prepared using the preferred procedure of Example 1 but employing temperatures of 50, 60 and 68° C. for reaction of the starch and phosphate salt. The evaluations are shown below:

| Example | Reaction Temperature, °C. | Result (Using Test Procedure of Example 2) |
|---|---|---|
| 4 | 50 | Granulation too fine; unclear filtrate |
| 5 | 60 | Satisfactory granulation, 3 minutes to obtain clear filtrate |
| 6 | 68 | Superior product over the above two, 2 minutes to obtain clear filtrate |

EXAMPLES 7–10

Filter aid precoats were prepared according to the procedure of Example 1 using different grades of cellulose as shown below:

| Example | Cellulose | % Starch basis | Filter precoat characteristics (Test of Example 2) |
|---|---|---|---|
| 7 | Solka-Floc ® 40 | 1.88 | Good |
| 8 | Solka-Floc ® 40 | 2.79 | Good |
| 9 | Solka-Floc ® 900* | 1.88 | Poor |
| 10 | Solka-Floc ® 900 | 1.79 | Poor |

*Solka-Floc ® 900 is a fibrous cellulose available from James River Corporation, Richmond, Virginia, having an average fiber length of 110 microns, bulk density of 5.0–5.5 cubic centimeters per gram and a water absorption capacity of 9.5 grams water per gram. It tends to break up or disintegrate upon physical contact.

EXAMPLES 11-12

Filter aid products were formulated as described in Example 1 except montmorillonite, Hectorite ® manufactured by Rheox, Inc., and KWK bentonite*, manufactured by American Colloid Company, were substituted for the bentonite of Example 1 on an equal weight basis.

** Hectorite is a sodium magnesium-fluoro-lithosilica and differs from bentonite principally by the presence of magnesium rather than aluminum in its lattice structure.

*** KWK bentonite is a hydrous silicate of alumina composed principally of the clay montmorillonite.

| Example | Inorganic Aid | Result (Test of Example 2) |
|---|---|---|
| 11 | Hectorite | Poor granulation; excessive clearing time during slurry recirculation; unsatisfactory product |
| 12 | KWK Bentonite | More compact precoat than the preferred bentonite of Example 1, but satisfactory |

EXAMPLES 13-14

Following the procedure of Example 1, two filter aid compositions were prepared and compared in which the adjusted pH after the starch-phosphate reaction was pH 5.0 for one product and pH 7.5 for the second product.

It was noted that traces of iron contributed by the bentonite were more readily separated in the wash water from the pH 5.0–5.5 neutralization, as evidenced by quantitative testing of the filtrate with 1,10-phenanthroline.

However, both products provided equal and satisfactory precoating characteristics.

EXAMPLES 15-16

Two filter aid compositions were prepared in accordance with the procedure of Example 1. In one case, tap water was used as the wash water for the filter cake and in the second case, the wash water contained 0.033% hydrogen peroxide.

It was observed that the filter aid product that was washed with the hydrogen peroxide wash water showed a desired, low level, microbial content, both aerobic and anaerobic. The filter precoat product that was washed with tap water showed microbiological counts that could possibly be unsatisfactory for filtration of commercial beer.

EXAMPLES 17-18

Two filter aid products prepared by the procedure of Example 1 were dried at two different temperatures to determine the effect on granular structure. The results were as shown below:

| Example | Drying Temperature | Results |
|---|---|---|
| 17 | 55° C., 20 hours | Somewhat fragile granules |
| 18 | 100° C., 3 hours | Compact granules |

EXAMPLE 19

A majority of brewers chillproof beer. The chill haze or cloudiness which may develop in cold beer was evaluated comparing a commercial filter aid material (Hyflo-Super-Cel available from Johns Manville Corporation) with the filter aid material of the invention as prepared in Example 1. In these evaluations the two compared filter aid materials were employed during primary filtration of beer and before the final filtration. Bottled beer was incubated at approximately 50° C. for about 96 hours and was then chilled to $-2°$ C. The difference between the haze (expressed in Formazin Turbidity Units (FTU) observed at $-1°$ C. and at 20° C. represents the chill haze. The results of this comparison are shown below:

| Hyflo-Super-Cel | Chill-proofing | CLARITY After 96 Hours at 50° C. | | Chill Haze FTU |
|---|---|---|---|---|
| | | Temp. Examination | | |
| | | <1° C. FTU | 20° C. FTU | |
| Primary Filter Aid | No | 745 | 110 | 635 |
| | Yes | 347 | 110 | 247 |
| Invention Filter Aid | No | 760 | 90 | 670 |
| | Yes | 296 | 110 | 186 |

The filter aid compositions of this invention can be advantageously used as a filter precoat for filtering a wide variety of liquids, particularly liquid beverages. The new filter aid composition can be used alone or in combination with other known filter precoat materials such as diatomaceous earths and others. The new filter aid compositions provide excellent clarity to chill-proofed beers.

The filter aid compositions of this invention can also be advantageously employed as a body feed composition in slurry form. As is well known in the brewery art, body feed materials such as a diatomaceous earth are added in amounts generally ranging from about 100 to 200 grams per 100 liters of beer as the beer is pumped to the primary filter.

Those modifications and equivalents which fall within the spirit of the invention are to be considered a part thereof.

What is claimed is:

1. A dry granular composition for use as a filter aid for precoating a filter screen used to filter liquids comprising a major amount of a cross-linked, substantially water-insoluble phosphorylated starch and minor amounts of a colloidal aluminum silicate clay and cellulosic fibers having a low capacity to absorb water, the particle size of the granular composition being sufficiently large for retention on a filter screen.

2. A composition in accordance with claim 1 wherein the combined amounts of clay and cellulosic fiber do not exceed about 10% by weight of the composition.

3. A bactericidal treated composition in accordance with claim 1.

4. A composition in accordance with claim 1 wherein the cellulosic fibers have an average length of at least 60 microns.

5. A process for producing a dry granular composition for use as a filter aid for precoating a filter screen used to filter liquids which comprises reacting starch with a phosphorylating agent to produce a cross-linked, substantially water-insoluble phosphorylated starch, incorporating with the phosphorylated starch minor amounts of a colloidal aluminum silicate clay and cellulosic fibers having a low capacity to absorb water, drying the phosphorylated starch, clay and cellulosic fiber mixture, and grinding the dried mixture to produce dry granules of a desired particle size.

6. A process in accordance with claim 5 wherein prior to drying of the recited mixture, it is washed with an aqueous solution of a microbicide.

7. A process in accordance with claim 5 wherein the reaction of the starch and phosphorylating agent is conducted at a temperature of at least about 60° C.

8. A process in accordance with claim 5 wherein a viscosity stabilizing agent is included during reaction of the starch and phosphorylating agent.

9. A process in accordance with claim 5 wherein drying is accomplished at a temperature above about 50° C.

* * * * *

UNITED STATES PATENT AND TRADEMARK OFFICE
CERTIFICATE OF CORRECTION

PATENT NO. : 5,114,894
DATED : May 19, 1992
INVENTOR(S) : Paul R. Witt

It is certified that error appears in the above-identified patent and that said Letters Patent is hereby corrected as shown below:

Title page, Column 1, at [73] Assignee: "Grain
    Processing corporation" should be -- Grain
    Processing Corporation --
Column 4, line 18, after "filtering" insert
    -- screen --
Column 6, line 31, change "Hyflo-Super-Cel" to
    -- Primary Filter Aid --
Column 6, lines 32 and 33, change "Primary Filter
    Aid" to -- Hyflo-Super-Cel --

Signed and Sealed this

Seventh Day of September, 1993

Attest:

BRUCE LEHMAN

*Attesting Officer*      *Commissioner of Patents and Trademarks*